(12) United States Patent
Umland

(10) Patent No.: US 9,942,248 B1
(45) Date of Patent: Apr. 10, 2018

(54) SYSTEMS AND METHODS FOR ADJUSTING BEHAVIORAL DETECTION HEURISTICS

(71) Applicant: Symantec Corporation, Mountain View, CA (US)

(72) Inventor: Torrey Umland, Torrance, CA (US)

(73) Assignee: Symantec Corporation, Mountain View, CA (US)

(*) Notice: Subject to any disclaimer, the term of this patent is extended or adjusted under 35 U.S.C. 154(b) by 128 days.

(21) Appl. No.: 14/748,268

(22) Filed: Jun. 24, 2015

(51) Int. Cl.
  G06F 21/00 (2013.01)
  H04L 29/06 (2006.01)
  H04L 29/08 (2006.01)

(52) U.S. Cl.
  CPC ...... *H04L 63/1408* (2013.01); *H04L 63/1441* (2013.01); *H04L 67/10* (2013.01)

(58) Field of Classification Search
  CPC . H04L 63/1408; H04L 63/1441; H04L 67/10; H04L 29/06911; H04L 29/06925; H04L 29/06931; H04L 29/06938; G06F 21/55
  See application file for complete search history.

(56) References Cited

U.S. PATENT DOCUMENTS

| | | | |
|---|---|---|---|
| 8,302,194 B2* | 10/2012 | Conrad | G06F 21/566 709/224 |
| 9,275,231 B1* | 3/2016 | Chen | G06F 21/56 |
| 2009/0144545 A1* | 6/2009 | Dhuvur | G06F 21/552 713/165 |
| 2011/0099634 A1* | 4/2011 | Conrad | H04L 63/1425 726/24 |
| 2015/0101049 A1* | 4/2015 | Lukacs | G06F 21/566 726/23 |

OTHER PUBLICATIONS

"What's New in the NAV Virus Definitions Files", ftp ://60.240.31.131/Nortons%20AV%20Programs/Norton%20NAV%20Enterprise%20Full%204.5/Disk%202/NAVCORP/ROLLOUT/CLIENTS/WIN95/VIRDEFS/WHATSNEW.TXT, as accessed May 21, 2015, Whatsnew.txt, Symantec AntiVirus Research Center (SARC), (Dec. 15, 1999).

* cited by examiner

*Primary Examiner* — Brandon Hoffman
*Assistant Examiner* — Helai Salehi
(74) *Attorney, Agent, or Firm* — FisherBroyles, LLP

(57) ABSTRACT

The disclosed computer-implemented method for adjusting behavioral detection heuristics may include (1) configuring a behavioral detection heuristic to provide an initial level of malicious behavior detection on a computing system, (2) using the behavioral detection heuristic at the initial level of malicious behavior detection to detect at least two security threats on the computing system, (3) determining that the time between the security threats is shorter than a predetermined length of time, and (4) in response to determining that the time between the security threats is shorter than the predetermined length of time, adjusting the behavioral detection heuristic to provide a heightened level of malicious behavior detection that is configured to catch at least one additional security threat that may not be caught using the initial level of malicious behavior detection. Various other methods, systems, and computer-readable media are also disclosed.

20 Claims, 7 Drawing Sheets

SYSTEMS AND METHODS FOR ADJUSTING BEHAVIORAL DETECTION HEURISTICS

BACKGROUND

Individuals and organizations often seek to protect themselves from attacks on networks and/or computing systems under their supervision. Attacks may take a variety of forms. For example, an attack may involve a file that executes malicious code. Other attacks may involve an executable attempting an unauthorized network connection, a buffer flow of a trusted program, or any other number of suspicious and/or malicious activities. In some scenarios, an individual or organization may suffer an attack from an advanced persistent threat (i.e., a sustained attempt on the part of an attacker to gain unauthorized network access to a computing system for an extended period of time). Advanced persistent threats generally employ continuous evasion techniques to remain undetected by traditional intrusion prevention systems.

Traditional methods for detecting threats may include heuristic analysis to detect variants of known issues. However, such analysis techniques generally examine potential threats in isolation from one another, without considering the broader security context within which a threat may occur. Furthermore, traditional methods for detecting advanced persistent threats are generally resource intensive yet may still fail to properly identify an attack. Accordingly, the instant disclosure identifies and addresses a need for additional and improved systems for implementing behavioral detection heuristics.

SUMMARY

As will be described in greater detail below, the instant disclosure describes various systems and methods for adjusting behavioral detection heuristics. By increasing the stringency of the heuristic analysis based on the number of security threats detected within a predetermined length of time, systems and methods described herein may enable security systems to protect computing devices against threats that might otherwise go unnoticed at a baseline level of detection. Moreover, by decreasing the stringency of the heuristic analysis when few or no threats are detected within a predetermined length of time, systems and methods described herein may enable the security system to conserve resources such as processor time, system memory, disk access time, network bandwidth, or other limited computing resources.

In one example, a computer-implemented method for adjusting behavioral detection heuristics may include (1) configuring a behavioral detection heuristic to provide an initial level of malicious behavior detection on a computing system, (2) using the behavioral detection heuristic at the initial level of malicious behavior detection to detect at least two security threats on the computing system, (3) determining that the time between the security threats is shorter than a predetermined length of time, and (4) in response to determining that the time between the security threats is shorter than the predetermined length of time, adjusting the behavioral detection heuristic to provide a heightened level of malicious behavior detection that is configured to catch at least one additional security threat that may not be caught using the initial level of malicious behavior detection. In some embodiments, the predetermined length of time is less than one day in duration.

In some examples, the computer-implemented method may further include detecting fewer than a threshold number of security threats after adjusting the behavioral detection heuristic to provide the heightened level of malicious behavior detection. In such examples, the computer-implemented method may include further adjusting, based on detecting fewer than the threshold number of security threats over the additional timeframe, the behavioral detection heuristic to provide a level of malicious behavior detection that is less than the heightened level of malicious behavior detection.

Additionally or alternatively, the computer-implemented method may include (1) detecting, while the behavioral detection heuristic operates at the heightened level of malicious behavior detection, an additional set of multiple security threats over an additional timeframe that occurs after adjusting the behavioral detection heuristic to provide a heightened level of malicious behavior detection and (2) adjusting, based on detecting the additional set of multiple security threats over the additional timeframe, the behavioral detection heuristic to a level of malicious behavior detection that is above the heightened level of malicious behavior detection and is configured to catch at least one security threat that may not be caught using the heightened level of malicious behavior detection.

In some examples, using the behavioral detection heuristic at the initial level of malicious behavior detection to detect at least two security threats may include detecting suspicious behavior from a trusted application. Using behavioral detection heuristic at the initial level of malicious behavior detection may additionally or alternatively include detecting at least one suspicious event that does not trigger a security response against the suspicious event. Furthermore, the behavioral detection heuristic may be applied to files executing within a sandbox that isolates the files from interacting with system resources outside the sandbox. The behavioral detection heuristic may additionally or alternatively be applied to network traffic from a computing system. In some examples, the behavioral detection heuristic may be used to detect an attack by an advanced persistent threat that includes multiple security threats across multiple computing systems that are part of the same network.

In one embodiment, a system for implementing the above-described method may include (1) a configuring module, stored in memory, that configures a behavioral detection heuristic to provide an initial level of malicious behavior detection on a computing system, (2) a detecting module, stored in memory, that uses the behavioral detection heuristic at the initial level of malicious behavior detection to detect at least two security threats on the computing system, (3) a determining module, stored in memory, that determines that the time between the security threats is shorter than a predetermined length of time, (4) an adjusting module, stored in memory, that in response to determining that the time between the security threats is shorter than the predetermined length of time, adjusts the behavioral detection heuristic to provide a heightened level of malicious behavior detection that is configured to catch at least one additional security threat that may not be caught using the initial level of malicious behavior detection, and (5) at least one physical processor configured to execute the configuring module, the detecting module, and the determining module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) configure a behavioral detection heuristic to provide an initial level of malicious behavior detection on a computing system, (2) use the behavioral detection heuristic at the initial level of malicious behavior detection to detect at least two security threats on the computing system, (3) determine that the time between the security threats is shorter than a predetermined length of time, and (4) in response to determining that the time between the security threats is shorter than the predetermined length of time, adjust the behavioral detection heuristic to provide a heightened level of malicious behavior detection that is configured to catch at least one additional security threat that may not be caught using the initial level of malicious behavior detection.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
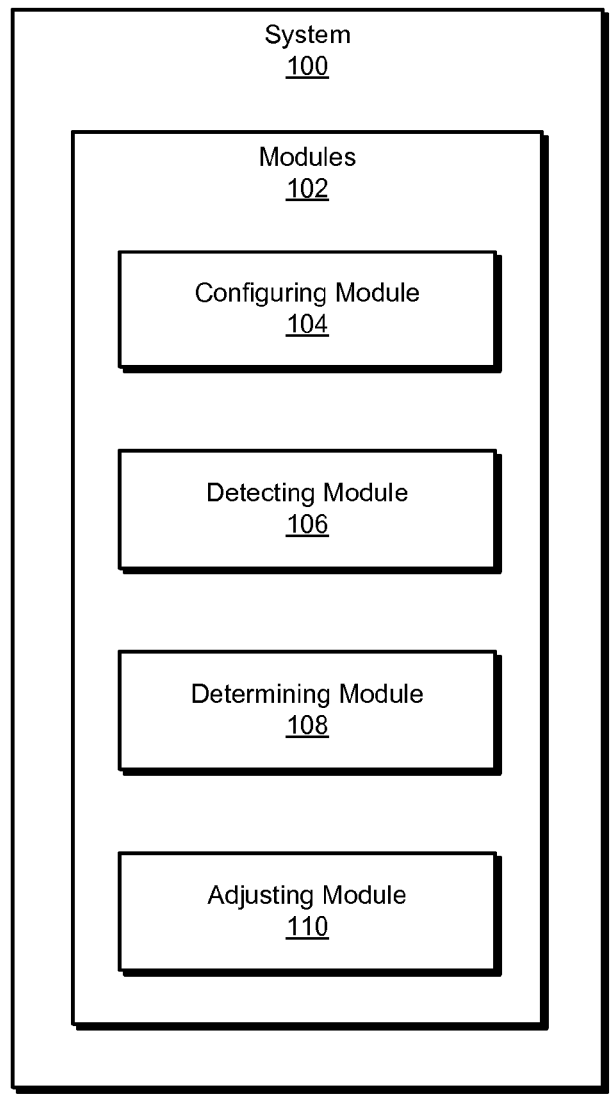
FIG. 1 is a block diagram of an exemplary system for adjusting behavioral detection heuristics.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for adjusting behavioral detection heuristics. As will be explained in greater detail below, systems and methods described herein may track how often security threats are discovered on a computing system and adjust behavioral detection heuristics based on how many threats are observed within a given length of time. Such systems and methods may intensify security requirements during times when many threats are being discovered in order to prevent attacks from slipping through unnoticed. Similarly, such systems and methods may relax security requirements when few threats are being discovered to conserve system resources such as processor time and network bandwidth.

Figure 2:
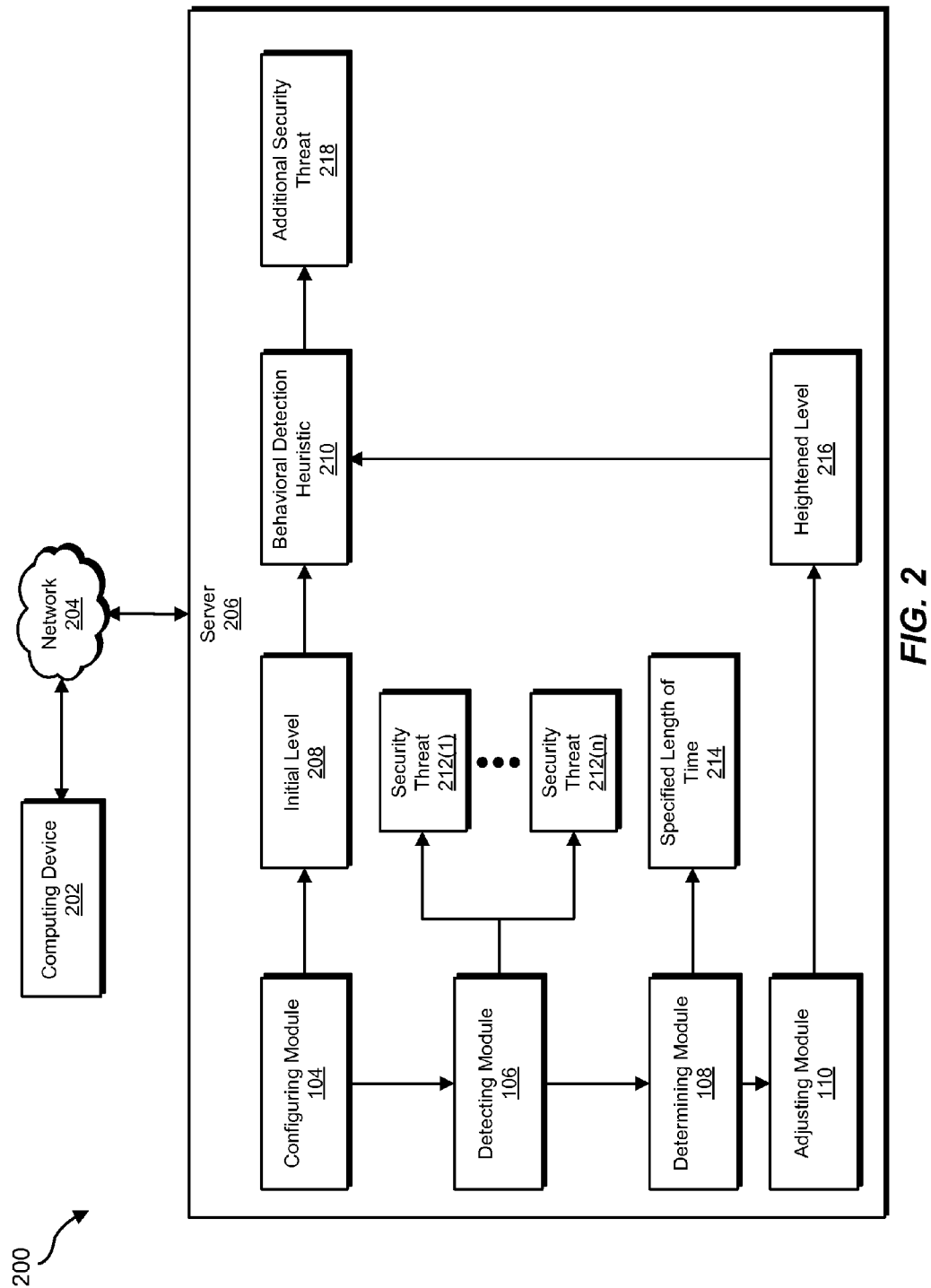
FIG. 2 is a block diagram of an additional exemplary system for adjusting behavioral detection heuristics.

The following will provide, with reference to FIGS. 1-2, detailed descriptions of exemplary systems for adjusting behavioral detection heuristics. Detailed descriptions of corresponding computer-implemented methods will also be provided in connection with FIG. 3. Detailed descriptions of further exemplary systems for adjusting behavioral detection heuristics will be provided in connection with FIG. 4. Detailed descriptions of attacks by advanced persistent threats will be provided in connection with FIG. 5. Additionally, detailed descriptions of an exemplary computing system and network architecture capable of implementing one or more of the embodiments described herein will be provided in connection with FIGS. 6 and 7, respectively.

FIG. 1 is a block diagram of exemplary system 100 for adjusting behavioral detection heuristics. As illustrated in this figure, exemplary system 100 may include one or more modules 102 for performing one or more tasks. For example, and as will be explained in greater detail below, exemplary system 100 may include a configuring module 104 that configures a behavioral detection heuristic to provide an initial level of malicious behavior detection on a computing system. Exemplary system 100 may additionally include a detecting module 106 that uses the behavioral detection heuristic at the initial level of malicious behavior detection to detect at least two security threats on the computing system. Exemplary system 100 may further include a determining module 108 that determines that the time between the security threats is shorter than a predetermined length of time. Moreover, exemplary system 100 may include an adjusting module 110 that adjusts the behavioral detection heuristic in response to determining that the time between the security threats is shorter than the predetermined length of time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to modify the intensity of protection provided by behavioral detection heuristics. As will be described in greater detail below, one or more of modules 102 may cause computing device 202 and/or server 206 to adjust behavioral detection heuristics. For example, configuring module 104 may configure a behavioral detection heuristic 210 to provide an initial level 208 of malicious behavior detection for server 206. Detecting module 106 may use behavioral detection heuristic 210 at initial level 208 of malicious behavior detection to detect security threats 212(1)-(n) on server 206. Determining module 108 may determine that the time between the security threats is shorter than specified length of time 214. Adjusting module 110 may then, based on determining module 108's determination, adjust behavioral detection heuristic 210 to provide a heightened level 216 of malicious behavior detection that is configured to catch additional security threat 218 that might otherwise not be caught using behavioral detection heuristic 210 at initial level 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of scanning for and identifying security threats. Server 206 may identify security threats that directly affect server 206. Additionally or alternatively, server 206 may identify security threats that affect computing devices that are connected to server 206 (e.g., computing device 202 via network 204). Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Behavioral detection heuristic 210 generally represents any system or method employed to detect security threats that are not necessarily catalogued within a database of security threats. In other words, behavioral detection heuristic 210 may be any dynamic detection heuristic that focuses on the behavior of a software application rather than static characteristics (e.g., such as signatures used in signature-based detection techniques). Behavioral detection heuristic 210 may employ a variety of methods to detect security threats, such as observing how a suspicious file behaves while executing within a sandboxed environment, or any other suitable method by which to analyze the behavior of a suspicious file. Behavioral detection heuristic 210 may analyze files for common malware-like activity, such as file replication, file overwrites, attempts to disguise the existence of the suspicious file, or any other behavior that may be indicative of a malicious file. Additionally or alternatively, behavioral detection heuristic 210 may analyze network traffic to and/or from a computing system. Behavioral detection heuristic 210 may identify security threats in the form of suspicious network activity such as denial-of-service attacks, port scans, access attempts from unauthorized devices, or any other network activity that indicates a potential threat.

As will be described in greater detail below, behavioral detection heuristic 210 may operate at various levels of scrutiny (e.g., at initial level 208 and/or heightened level 216). Higher levels of scrutiny may result in less stringent requirements for a file to be identified as malicious. For example, behavioral detection heuristic 210 operating at an initial level of malicious behavior detection may flag a file as malicious when the file exhibits malware-like behaviors and is identified as malicious in a reputation database. In this example, behavioral detection heuristic 210 operating at a heightened level of malicious behavior detection may flag files that exhibit malware-like behaviors as malicious even if behavioral detection heuristic 210 cannot match the files to entries in the reputation database. Behavioral detection heuristic 210 may use any variety of detection schemes for identifying malicious or unwanted files in addition to the examples provided herein. Depending on the quantity and/or quality of threats detected in a given length of time, systems and methods described herein may adjust the level of scrutiny used by behavioral detection heuristic 210.

Figure 3:
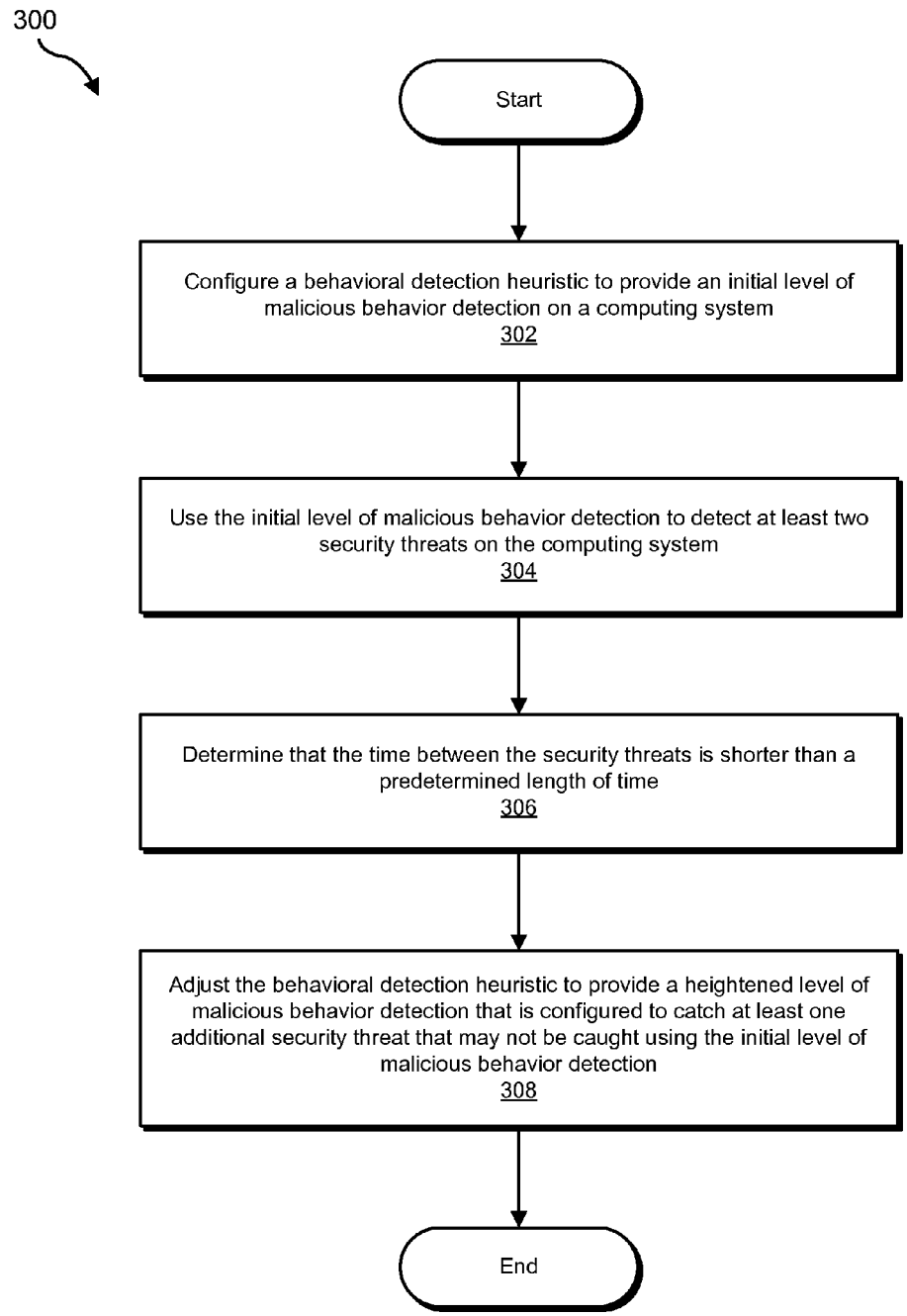
FIG. 3 is a flow diagram of an exemplary method for adjusting behavioral detection heuristics.
Figure 4:
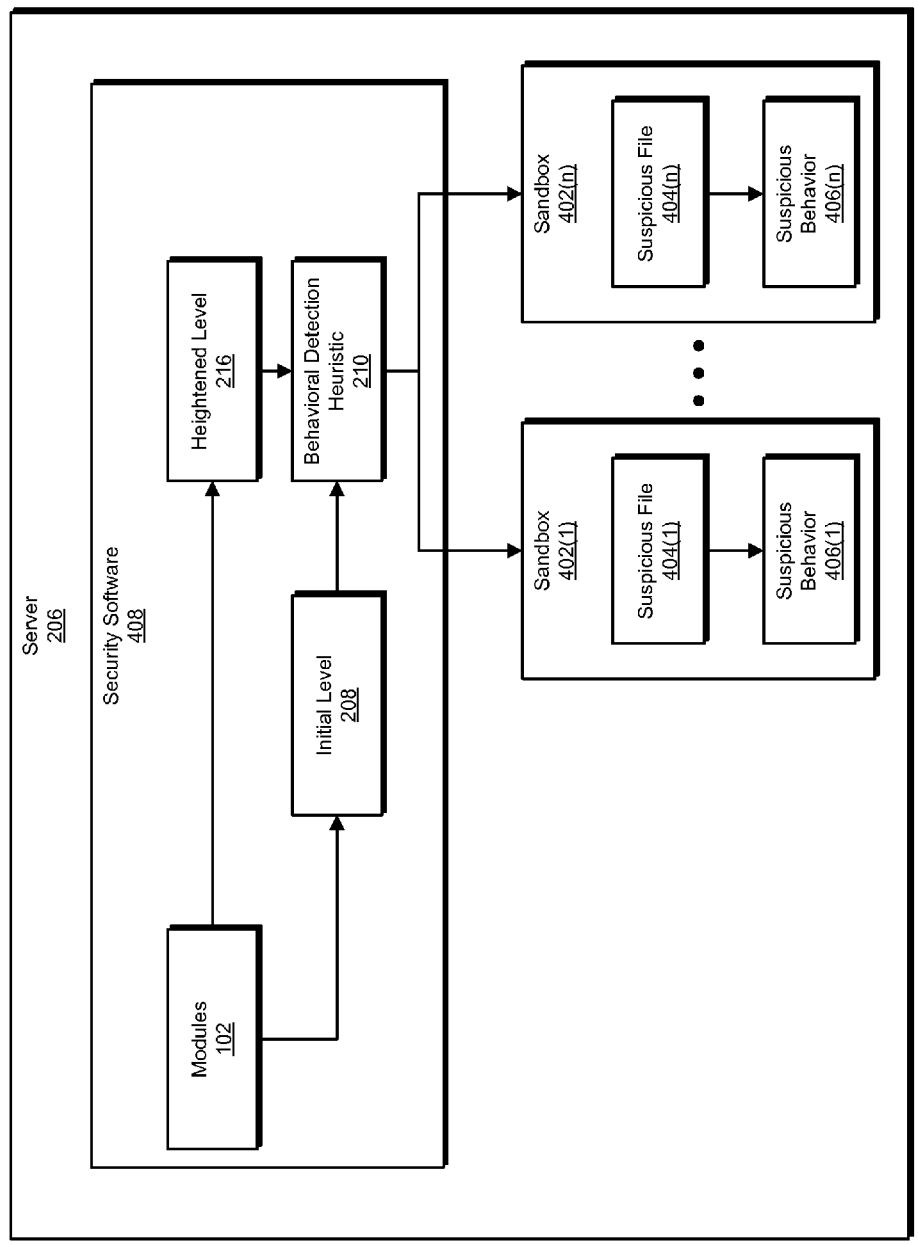
FIG. 4 is a block diagram of an exemplary computing system that is under attack by an advanced persistent threat.

FIG. 3 is a flow diagram of an exemplary computer-implemented method 300 for adjusting behavioral detection heuristics. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may configure a behavioral detection heuristic to provide an initial level of malicious behavior detection on a computing system. For example, configuring module 104 may, as part of server 206 in FIG. 2, configure behavioral detection heuristic 210 to provide initial level 208 of malicious behavior detection on server 206.

Configuring module 104 may configure behavioral detection heuristic 210 in a variety of ways. For example, configuring module 104 and behavioral detection heuristic 210 may be part of anti-malware security software that uses behavioral detection heuristic 210 at initial level 208 as a default or baseline to monitor a computing system for malicious activity. Additionally or alternatively, a user may direct configuring module 104 to configure behavioral detection heuristic 210 to use a particular set of rules to implement initial level 208 when searching for malicious files or network activity.

At step 304, one or more of the systems described herein may use the behavioral detection heuristic at the initial level of malicious behavior detection to detect at least two security threats on the computing system. For example, detecting module 106 may, as part of server 206 in FIG. 2, use behavioral detection heuristic 210 at initial level 208 of malicious behavior detection to detect security threats 212 (1)-(n) on server 206.

Detecting module 106 may use behavioral detection heuristic 210 to detect security threats 212(1)-(n) in a variety of contexts. In one example, detecting module 106 may be part of anti-malware software that protects a single computing device, such as computing device 202 in FIG. 2, from malicious activity. Additionally or alternatively, detecting module 106 may operate as part of a software security suite that monitors a group of computing devices that are connected through a network. In this context, detecting module 106 may operate as part of a server, e.g., server 206 in FIG. 2. As a specific example, detecting module 106 may apply behavioral detection heuristic 210 to network activity through network 204 as part of protecting computing device 202 and/or server 206 from security threats.

Detecting module 106 may detect security threats in a variety of ways. For example, detecting module 106 may apply behavioral detection heuristic 210 to network traffic travelling to and/or from a computing system. Additionally or alternatively, detecting module 106 may apply behavioral detection heuristic 210 to function calls, memory calls, or any other action taken by a file while the file executes. In some embodiments, detecting module 106 may detect a suspicious event from a trusted application. For example, detecting module 106 may detect that a trusted application suffered a buffer overflow.

Depending on the source and/or type of the suspicious event, detecting module 106 may qualify an event as suspicious for purposes of determining that behavioral detection heuristic 210 should be adjusted even if the suspicious event does not trigger a security response. For example, a trusted application may save a file to a restricted location, but security software may not engage in any direct measures against the application saving the file. As a specific example, NOTEPAD may save a text file at the file path "C:\windows\system32\drivers\etc" and not trigger a security response such as blocking the action. Despite NOTEPAD not triggering a security response, detection module 106 may nevertheless track the action of NOTEPAD saving the file to the restricted location as a suspicious action. As an additional example, a software security system may incorporate a "beta" or test version of a detection heuristic. The publisher of the software security system may disallow the detection heuristic from taking and/or prompting security actions against perceived threats in order to field-test the detection heuristic without causing undue problems for end users. Once again, detection module 106 may nevertheless track events detected by the "beta" detection heuristic as suspicious events.

Additionally or alternatively, detecting module 106 may deliberately cause a file to execute in order to examine the file for suspicious behavior. For example, detecting module 106 may cause a file to execute within a sandbox that isolates the file from interacting with system resources outside the sandbox. As an illustrated example and with reference to FIG. 4, modules 102 may operate as part of security software 408 that provides security services for server 206. As will be described in greater detail below, one or more of modules 102 may configure behavioral detection heuristic 210 to operate at either initial level 208 or heightened level 216 of malicious behavior detection. Security software 408 may identify suspicious files 404(1)-(n) as files that potentially present a security threat to server 206. Modules 102 may then apply behavioral detection heuristic 210 to suspicious files 404(1)-(n) to examine suspicious files 404 for any suspicious behavior 406(1)-(n).

Examples of suspicious behavior that a file might take include, without limitation, accessing system files, creating copies of the file, creating files in restricted locations, deleting files, undertaking efforts to hide the existence of files, or any other behavior that an individual or organization deems suspicious. Security software 408 may execute each of suspicious files 404(1)-(n) within a corresponding sandbox 402(1)-(n) in order to isolate suspicious files 404 from interacting with system resources of server 206. Executing suspicious files 404 within sandbox 402 may enable modules 102 to apply behavioral detection heuristic 210 to the execution of suspicious files 404 without compromising the security of server 206.

Although the above examples describe detecting security threats on a single computing system, detecting module 106 may additionally or alternatively detect threats across multiple computing systems. For example, an organization may connect computing systems in a particular office building together. In this example, detecting module 106 may operate as part of a gateway, server, or other network management system that supervises the organization's network. Detecting module 106 may thus detect threats to multiple computing systems that are part of the same network.

At step 306 in FIG. 3, one or more of the systems described herein may determine that the time between the security threats is shorter than a predetermined length of time. For example, determining module 108 may, as part of server 206 in FIG. 2, determine that security threats 212(1)-(n) occur within specified length of time 214.

In one embodiment, specified length of time 214 may be one day in duration. Determining module 108 may accordingly determine that security threats 212(1)-(n) occur within the timespan of one day. Although this example uses one day as the specified length of time and describes determining module 108 tracking the time between two threats, determining module 108 may track any number of threats detected by detecting module 106 over any length of time. For example, determining module 108 may evaluate the number of threats detected by detecting module 106 per hour and, as will be described in greater detail below, cause adjusting module 110 to adjust behavioral detection heuristic 210 accordingly.

Additionally, a system administrator may configure determining module 108 to vary specified length of time 214 based on certain criteria. For example, a system administrator may configure determining module 108 to call out security threats that happen within minutes of each other during the day and call out security threats that happen within hours of each other during the night. This particular pattern of varying specified length of time 214 is merely one example, as specified length of time 214 may be varied in any suitable pattern either manually, by an automated system, or a combination of both. Once determining module 108 determines that at least two security threats have occurred within specified length of time 214 of each other, systems described herein may, based on this determination, adjust behavioral detection heuristic 210.

At step 308 in FIG. 3, one or more of the systems described herein may adjust the behavioral detection heuristic to provide a heightened level of malicious behavior detection that is configured to catch at least one additional security threat that would not be caught using the initial level of malicious behavior detection. For example, adjusting module 110 may, as part of server 206 in FIG. 2, adjust behavioral detection heuristic 210 to provide heightened level 216 of malicious behavior detection that is configured to catch additional security threat 218. Additional security threat 218 may not be caught using behavioral detection heuristic 210 at initial level 208 of malicious behavior detection.

Adjusting module 110 may adjust malicious behavioral detection heuristic 210 in a variety of ways. For example and as described above, determining module 108 may track the number of security threats to a computing system that occur per day. In such an example, determining module 108 may determine that server 206 has suffered greater than a threshold number of threats in a given day. Adjusting module 110 may accordingly adjust behavioral detection heuristic 210 to provide heightened level 216 of malicious behavior detection in order to protect server 206 against further attacks.

Such attacks may take a variety of forms. For example, the network supervised by server 206 may come under attack by an advanced persistent threat. The term "advanced persistent threat" as used herein generally refers to an entity that undertakes a series of attacks on a computing system and/or network using multiple intrusion and/or intelligence-gathering techniques along with continuous monitoring over a period of time in order to disguise the attack and achieve an objective, such as theft of data, on the targeted computing system and/or network.

Figure 5:
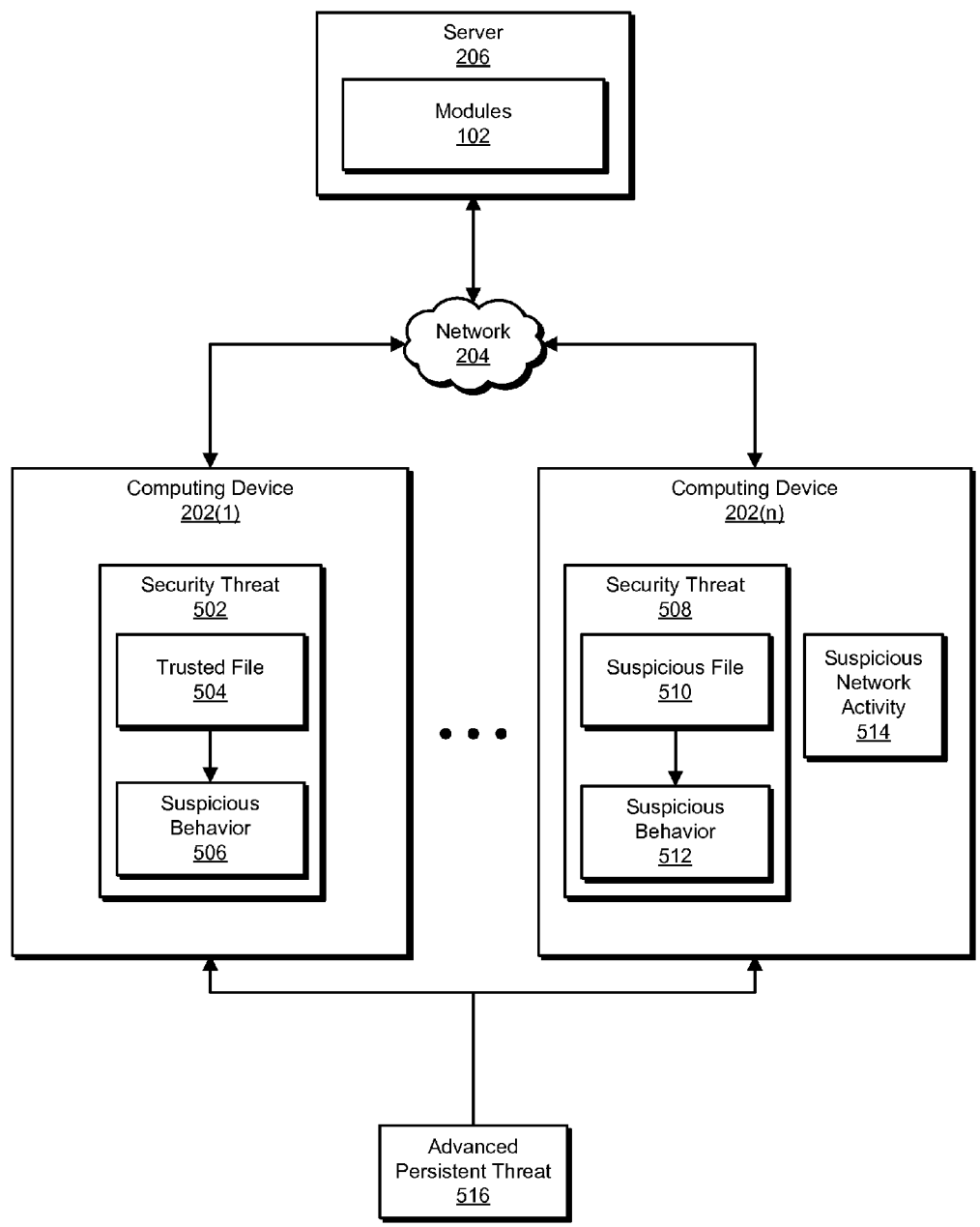
FIG. 5 is a block diagram of an exemplary computing system for adjusting behavioral detection heuristics that uses a sandbox to test files in isolation from the rest of the computing system.

An example of an attack by an advanced persistent threat is provided in connection with FIG. 5. In this example, server 206 may be programmed with one or more of modules 102 and supervise a series of computing devices 202(1)-(n) connected to network 204. An advanced persistent threat 516 may cause any number of security threats on the network, such as by compromising trusted file 504 on computing device 202(1), delivering suspicious file 510 to computing device 202(n), causing suspicious network activity 514 on computing device 202(n), or by any other method or mechanism of compromising the security of a computing system.

Modules 102 may detect security threat 502 when trusted file 504 exhibits suspicious behavior 506. Additionally or alternatively, modules 102 may detect security threat 508 by observing suspicious file 510 that exhibits suspicious behavior 512 when executed, for example, within a sandbox. Furthermore, modules 102 may detect suspicious network activity 514 from computing device 202(n). Advanced persistent threat 516 may cause any number or type of security threats on any of computing devices 202(1)-(n). As described above, security threat 502 and security threat 508 may happen concurrently or at different times. Upon detecting these security threats and determining that a threshold number of security threats happened within a specified length of time, one or more of modules 102 may adjust behavioral detection heuristic 210 to provide a heightened level of malicious behavior detection.

Systems and methods described herein may adjust behavioral detection heuristic 210 based on the quality of threats detected by detecting module 106. For example, detecting module 106 may assign a weight to detected security threats, with more severe threats being assigned heavier weights. One or more of modules 102 may use this weighting information when determining how to adjust behavioral detection heuristic 210. For example, detecting relatively insignificant threats in a particular length of time may carry low weighting values. Such threats may not trigger adjusting module 110 to adjust behavioral detection heuristic 210 to a heightened level of malicious behavior detection even if many such threats are detected in a short amount of time. Similarly, detecting a small number of severe, and accordingly heavier weighted, threats in a particular length of time may be sufficient to trigger adjusting module 110 to increase the level of malicious behavior detection. Such weighting schemes may also be used to determine if and when it is appropriate to relax behavioral detection heuristic 210 to a reduced state of malicious behavior detection.

In some embodiments, systems and methods described herein may continue to evaluate the security environment under their supervision and adjust the aggressiveness of behavioral detection heuristics accordingly. In some embodiments, detecting module 106 may detect fewer than a threshold number of security threats over an additional length of time that occurs after specified length of time 214. For example, detecting module 106 may, as part of security software 408 in FIG. 4, detect fewer than a threshold number of threats over a span of time while using behavioral detection heuristic 210 at heightened level 216 of malicious behavior detection. Adjusting module 110 may accordingly adjust behavioral detection heuristic 210 to provide a reduced level of malicious behavior detection. This reduced level of malicious behavior may be more stringent than initial level 208 of malicious behavior detection, equivalent to initial level 208, or even less stringent than initial level 208.

Additionally or alternatively, detecting module 106 may detect greater than a threshold number of security threats over an additional length of time that occurs after specified length of time 214 and accordingly cause adjusting module 110 to adjust behavioral detection heuristic 210 to provide a level of malicious behavior detection that is above heightened level 216 of malicious behavior detection and is configured to catch additional security threats that might otherwise evade detection by applying behavioral detection heuristic 210 at heightened level 216 of malicious behavior detection.

In addition to adjusting behavioral detection heuristic 210, systems and methods described herein may alert other security systems that threshold levels of threats have or have not been detected. For example, detecting module 106 may, as part of security software 408 on server 206, detect greater than a threshold number of threats in a specified length of time and cause adjusting module 110 to adjust behavioral detection heuristic 210. Adjusting module 110 may additionally notify other security systems either on or connected to server 206 that the threshold number of threats has been exceeded and cause those security systems to adjust their behavior accordingly. Similarly, adjusting module may notify other security systems when detecting module 106 detects fewer than a threshold number of threats in a specified length of time and cause the other security systems to adjust their settings accordingly.

As described in greater detail above, systems and methods described herein may track how often security threats are discovered on a computing system and adjust behavioral detection heuristics based on how many threats are observed within a given length of time. Such systems and methods may intensify security requirements during times when many threats are being discovered in order to prevent attacks from slipping through unnoticed. Similarly, such systems and methods may relax security requirements when few threats are being discovered in order to conserve system resources such as processor time and network bandwidth.

Figure 6:
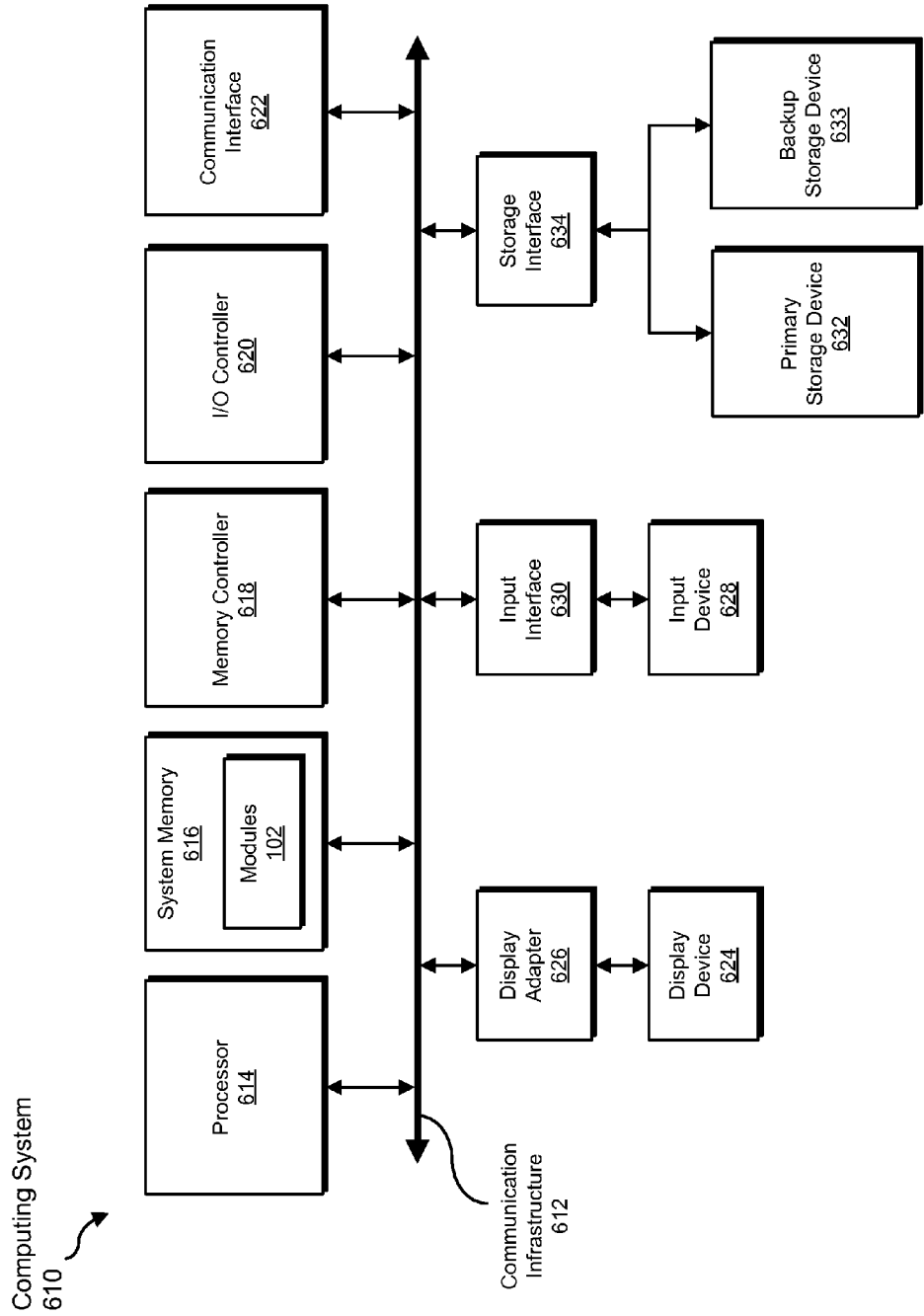
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
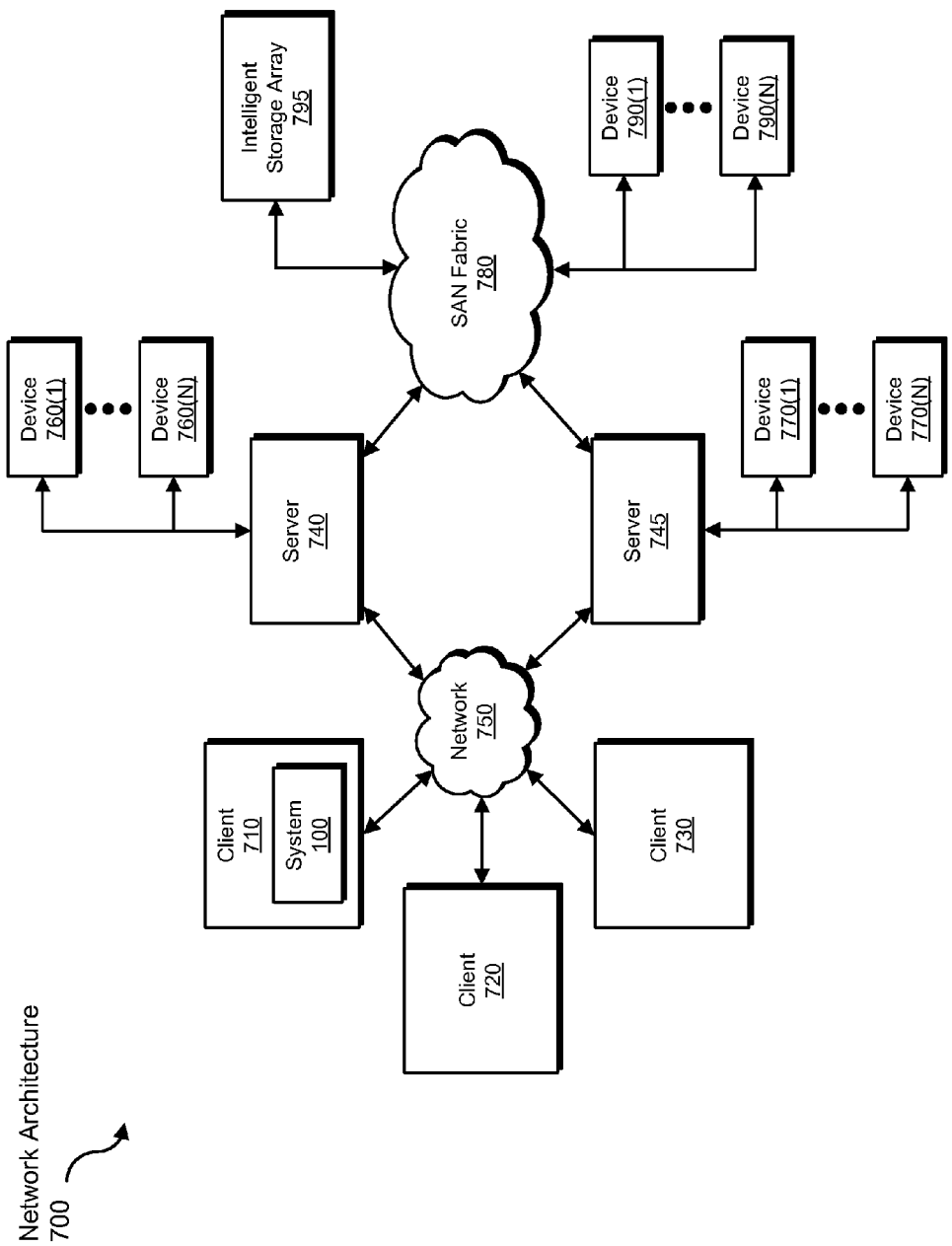
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for adjusting behavioral detection heuristics.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive configuration information to be transformed, identify security context information to be transformed, transform the information into a determination, apply the determination to adjust a detection heuristic, output a result of the transformation to a user interface device such as a monitor, deliver the determination information to other systems to be transformed, and/or store a result of the transformation to a database that records when security threats were detected. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for adjusting behavioral detection heuristics, at least a portion of the method being performed by a computing device comprising at least one processor, the method comprising:
   configuring, by the processor of the computing device, a dynamic behavioral detection heuristic to provide an initial level of malicious behavior detection on a computing system;
   using the dynamic behavioral detection heuristic at the initial level of malicious behavior detection to detect at least two security threats that each represent separate instances of abnormal activity on the computing system, wherein detecting the at least two security threats comprises:
   detecting at least one suspicious event that does not trigger a security response against the suspicious event; and
   detecting suspicious behavior that is not from an application that is already known to be malicious;
   determining that the at least two security threats were detected within a predetermined length of time; and
   in response to detecting the at least two security threats within the predetermined length of time, adjusting the dynamic behavioral detection heuristic to provide a heightened level of malicious behavior detection that is configured to catch at least one additional security threat that may not be caught using the initial level of malicious behavior detection.

2. The method of claim 1, further comprising:
   detecting fewer than a threshold number of security threats over an additional timeframe that occurs after adjusting the behavioral detection heuristic to provide a heightened level of malicious behavior detection; and
   adjusting, based on detecting fewer than the threshold number of security threats over the additional timeframe, the behavioral detection heuristic to provide a level of malicious behavior detection that is less than the heightened level of malicious behavior detection.

3. The method of claim 1, further comprising:
   detecting, with the behavioral detection heuristic at the heightened level of malicious behavior detection, an additional set of multiple security threats over an additional timeframe that occurs after adjusting the behavioral detection heuristic to provide a heightened level of malicious behavior detection; and
   adjusting, based on detecting the additional set of multiple security threats over the additional timeframe, the behavioral detection heuristic to a level of malicious behavior detection that is above the heightened level of malicious behavior detection and is configured to catch at least one security threat that may not be caught using the heightened level of malicious behavior detection.

4. The method of claim 1, wherein the behavioral detection heuristic is applied to files executing within a sandbox that isolates the files from interacting with system resources outside the sandbox.

5. The method of claim 1, wherein the behavioral detection heuristic is applied to network traffic from a computing system.

6. The method of claim 1, wherein detecting the additional security threat comprises detecting an attack from an advanced persistent threat that includes multiple security threats across multiple computing systems that are part of the same network.

7. The method of claim 1, wherein using the behavioral detection heuristic at the initial level of malicious behavior detection to detect the at least two security threats comprises detecting suspicious behavior from a trusted application.

8. The method of claim 1, wherein the predetermined length of time is less than one day in duration.

9. A system for adjusting behavioral detection heuristics, the system comprising:
   a configuring module, stored in a memory of the system, that configures a dynamic behavioral detection heuristic to provide an initial level of malicious behavior detection on a computing system;
   a detecting module, stored in the memory, that applies the dynamic behavioral detection heuristic at the initial level of malicious behavior detection to detect at least two security threats that each represent separate instances of abnormal activity on the computing system, wherein detecting the at least two security threats comprises:
   detecting at least one suspicious event that does not trigger a security response against the suspicious event; and detecting suspicious behavior that is not from an application that is already known to be malicious;
a determining module, stored in the memory, that determines that the at least two security threats were detected within a predetermined length of time;
an adjusting module, stored in the memory, that in response to determining that at least two security threats were detected within the predetermined length of time, adjusts the dynamic behavioral detection heuristic to provide a heightened level of malicious behavior detection that is configured to catch at least one additional security threat that may not be caught using the initial level of malicious behavior detection; and
at least one physical processor configured to execute the configuring module, the detecting module, the determining module, and the adjusting module.

10. The system of claim 9, wherein:
the detecting module detects fewer than a threshold number of security threats over an additional timeframe that occurs after adjusting the behavioral detection heuristic to provide a heightened level of malicious behavior detection; and
the adjusting module adjusts, based on detecting fewer than the threshold number of security threats over the additional timeframe, the behavioral detection heuristic to provide a level of malicious behavior detection that is less than the heightened level of malicious behavior detection.

11. The system of claim 9, wherein:
the detecting module detects, with the behavioral detection heuristic at the heightened level of malicious behavior detection, an additional set of multiple security threats over an additional timeframe that occurs after adjusting the behavioral detection heuristic to provide a heightened level of malicious behavior detection; and
the adjusting module adjusts, based on detecting the additional set of multiple security threats over the additional timeframe, the behavioral detection heuristic to a level of malicious behavior detection that is above the heightened level of malicious behavior detection and is configured to catch at least one security threat that may not be caught using the heightened level of malicious behavior detection.

12. The system of claim 9, wherein the detecting module applies the behavioral detection heuristic to files executing within a sandbox that isolates the files from interacting with system resources outside the sandbox.

13. The system of claim 9, wherein the detecting module applies the behavioral detection heuristic to network traffic from a computing system.

14. The system of claim 9, wherein the detecting module detects the additional security threat by detecting an advanced persistent threat that includes multiple security threats across multiple computing systems that are part of the same network.

15. The system of claim 9, wherein the detecting module applies the behavioral detection heuristic at the initial level of malicious behavior detection to detect at least two security threats by detecting suspicious behavior from a trusted application.

16. The system of claim 9, wherein the predetermined length of time is less than one day in duration.

17. A non-transitory computer-readable medium comprising one or more computer-readable instructions that, when executed by at least one processor of a computing device, cause the computing device to:
configure a dynamic behavioral detection heuristic that evaluates the behavior of files and applications for abnormal activity to provide an initial level of malicious behavior detection on a computing system;
use the dynamic behavioral detection heuristic at initial level of malicious behavior detection to detect at least two security threats that each represent separate instances of abnormal activity on the computing system, wherein detecting the at least two security threats comprises:
detecting at least one suspicious event that does not trigger a security response against the suspicious event; and
detecting suspicious behavior that is not from an application that is already known to be malicious;
determine that the at least two security threats were detected within a predetermined length of time; and
in response detecting the at least two security threats within the predetermined length of time, adjust the dynamic behavioral detection heuristic to provide a heightened level of malicious behavior detection that is configured to catch at least one additional security threat that may not be caught using the initial level of malicious behavior detection.

18. The non-transitory computer-readable medium of claim 17, wherein the one or more computer-readable instructions cause the computing device to:
detect fewer than a threshold number of security threats over an additional timeframe that occurs after adjusting the behavioral detection heuristic to provide a heightened level of malicious behavior detection; and
adjust, based on detecting fewer than the threshold number of security threats over the additional timeframe, the behavioral detection heuristic to provide a level of malicious behavior detection that is less than the heightened level of malicious behavior detection.

19. The non-transitory computer-readable medium of claim 17, wherein the one or more computer-readable instructions cause the computing device to:
detect, with the behavioral detection heuristic at the heightened level of malicious behavior detection, an additional set of multiple security threats over an additional timeframe that occurs after adjusting the behavioral detection heuristic to provide a heightened level of malicious behavior detection; and
adjust, based on detecting the additional set of multiple security threats over the additional timeframe, the behavioral detection heuristic to a level of malicious behavior detection that is above the heightened level of malicious behavior detection and is configured to catch at least one security threat that may not be caught using the heightened level of malicious behavior detection.

20. The non-transitory computer-readable medium of claim 17, wherein the behavioral detection heuristic is applied to files executing within a sandbox that isolates the files from interacting with system resources outside the sandbox.

* * * * *